United States Patent [19]
Schleich

[11] 3,763,010
[45] Oct. 2, 1973

[54] STABILIZED MICROBIAL RENNET
[75] Inventor: Hans Schleich, Staten Island, N.Y.
[73] Assignee: Baxter Laboratories, Inc., Morton Grove, Ill.
[22] Filed: June 10, 1971
[21] Appl. No.: 151,992

[52] U.S. Cl. .................................................. 195/63
[51] Int. Cl. ............................................. C07g 7/02
[58] Field of Search ............................... 195/63, 68

[56] References Cited
UNITED STATES PATENTS
3,573,170   3/1971   Clark et al. ..................... 195/68 X
FOREIGN PATENTS OR APPLICATIONS
1,207,892   10/1970   Great Britain
962,321   7/1964   Great Britain

OTHER PUBLICATIONS

Kahn, et al., Influence of Detergents on Enzymic Activity of Cactus Mitochondria, Chemical Abstracts, Vol. 72, 3/1970 (p. 40(63003k)). QD1A51C.2

Primary Examiner—David M. Naff
Attorney—Scott J. Meyer

[57] ABSTRACT

A stabilized microbial rennet from Mucor miehei is prepared by admixing the solid enzyme product recovered from the fermentation broth with 2–3 percent of fatty acid monoesters of polyoxyethylene sorbitan.

4 Claims, No Drawings

STABILIZED MICROBIAL RENNET

This invention relates to a novel microbial rennet enzyme preparation. More particularly, it relates to a stabilized milk coagulating enzyme preparation obtained from the growth culture of the microorganism Mucor miehei.

The conventional method of making cheese involves the use of rennet for coagulating milk. Rennet is an enzyme preparation generally obtained from the fourth stomach of milk-fed calves. In the process of making cheese, the rennet is added to milk and the enzyme, rennin, exerts a mildly proteolytic action on the casein and other proteins present in milk. This breakdown of the proteins causes the milk to coagulate and form solid curds. These curds are separated from the whey, which is predominantly an aqueous suspension of low solids content. The curds are then mixed with salt, etc., and shaped into blocks or rounds and cured to form cheese.

Because of the particular animal origin of rennet, the supply and quality of rennet are subject to wide fluctuations. In view of these variable factors, investigators in the field have attempted to find suitable cheese making substitutes for rennet.

Recently, the microorganism Mucor miehei has been found to have significant use for the production of a good quality microbial rennet. Such use is described, for example, in British Patent Nos. 1,108,287 and 1,207,892; U.S. Pat. No. 3,549,390; U.S. Pat. applications Ser. No. 688,349, filed Dec. 6, 1967, and Ser. No. 95,320, filed Dec. 4, 1970; and Danish Patent Application No. 5118/66. A more complete description of the microorganism Mucro miehei can be found in the treatise by Cooney and Emerson, "Thermophilic Fungi," pp. 17–27 (1964), published by W. H. Freeman and Co., San Francisco and London.

The production of microbial rennet according to the aforesaid patents and patent applications generally comprises inoculation of a nutrient medium with a selected culture of Mucor miehei, incubation under aerobic fermentation conditions together with suitable pH, time and temperature conditions, followed by recovery of the resulting rennet from the fermentation broth.

In British Patent No. 1,207,892, a preferred procedure for recovering the rennet product comprises salt or solvent precipitation of the fermentation broth and recovery of a concentrated, fine white powder. While this powder has an acceptable level of stability, it is frequently more desirable to make the rennet available in a liquid form. However, the powdery material does not lend itself to the most desired ease of handling for preparation of a liquid product; that is, the powder tends to dust and does not have the optimum solubility.

In accordance with the present invention, a stabilized microbial rennet from Mucor miehei is prepared by admixing the solid enzyme product recovered from the fermentation broth with from about 2 percent to about 3 percent by weight of fatty acid monoesters of polyoxyethylene sorbitan. The esters employed in the invention have from about 12 to about 22 carbon atoms in the fatty acid moiety and an average of about 20 oxyethylene units per molecule. These esters are commercially available under the trademark "Tween" and their method of preparation is described in detail in U. S. Pat. No. 2,380,166.

A mixture of the stated amount of the ester with the solid enzyme product from the Mucor miehei fermentation is important. Use of less than about 2 percent of the ester does not provide the desired ease of handling from the standpoint of both dedusting and solubility in aqueous solution, whereas use of greater than about 3 percent of the ester produces a solid porduct that is too wet and lumpy and otherwise is difficult to handle or store.

The preferred polyoxyethylene sorbitan monoester for admixing with the dry rennet product is polyoxyethylene (20) sorbitan monooleate ("Tween 80"). This substance has an optimum balance of hydrophilic and lipophilic moieties in the molecule for admixture with the microbial rennet enzyme product in accordance with the objectives of the present invention.

The dry rennet product which can be stabilized in accordance with the present invention can comprise the filtered and precipitated culture broth following suitable fermentation as described, for example, in British Patent No. 1,207,892, or it can comprise, for example, similar such products which have been further concentrated or dried such as by vacuum drying, freeze drying, spray drying and the like drying procedures.

In general, the fermentation is conducted by inoculating a medium containing available carbon, nitrogen and trace nutrients with a selected culture of Mucor miehei and fermenting under submerged aerobic conditions at a pH of from about 3 to about 8 and a temperature of from about 30° C to about 55° C for about 2 to about 14 days. The rennet is preferably recovered from the fermentation broth by precipitation with an organic solvent such as a low molecular weight ketone, for example, acetone, or methyl ethyl ketone, or a low molecular weight alcohol, for example, methanol or ethanol. Any undesired residual lipase in the product is preferably inactivated by temporary adjustment to a pH below about 3 and at a temperature above about 40° C for at least about 60 minutes.

The preferred strains of Mucor miehel which are used in the invention are available to the public without restriction under the code designations NRRL A13,131 and A13,042 at the Northern Regional Reserach Laboratories, Peoria, Ill.

It will be appreciated that the stabilized rennet enzyme preparation of this invention can also contain for their desired effects minor amounts of conventional rennet additives, for example, salts such as sodium chloride, mold inhibitors and preservatives such as sorbic acid, potassium sorbate, or sodium benzoate and other such non-toxic, rennet-compatible substances.

When employed in the liquid form, the enzyme preparation preferably is contained in an aqueous base solution containing about 17.5 percent sodium chloride and about 2.5 percent propylene glycol.

Other additives which can be incorporated in the rennet enzyme preparation of the present invention will be apparent to those skilled in the art after reading specification hereof and the appended claims.

The following examples will further illustrate the invention although it will be understood that the invention is not limited to these specific examples.

As used herein, the term SRA means standard rennet activity. The SRA of a rennet product is defined as the number of rennet units per gram of the product based on a commercially available standard rennet extract known as Chris Hansen's Cheese Rennet. This standard rennet extract, which is a calf rennet, is assigned the value: SRA = 100. Therefore, one rennet unit is the activity of ten milligrams of standard rennet extract. The assay conditions comprise incubation of the rennet product at 25° C in a substrate consisting of 10 percent non-fat dry milk solids in aqueous 0.01 molar calcium chloride.

EXAMPLE 1

Mucor miehei, NRRL A13,042 is transferred from an agar slant under sterile conditions into a 1 liter Fernbach flask containing 200 ml. of the following aqueous medium:

| | |
|---|---|
| Soybean flour (Nutrisoy 300 c.) | 1.5% |
| Dried Whey | 3.0% |
| Degraded Cornstarch | 12.0% |
| Water | 83.5% |
| | 100.0% |

The flask is incubated on a rotary shaker at 37° C for 114 hours. The fermentation broth is filtered and the filtrate shows an activity equal to 125 SRA. The filtrate is then evaporated to about 15–20 percent of its volume. The concentrated evaporate is then adjusted to a pH of 2.6 with 0.1 normal HCl and then heated to 44° C and retained at that temperature for 90 minutes. The pH is readjusted to 4.0, the product is precipitated with methanol, and the solvent is evaporated, yielding a lipase-free rennet powder having an activity of 1,000 SRA. The fine, white powder is than admixed with 2 percent by weight polyoxyethylene (20) sorbitan monooleate. This admixture is storage stable, dust free and readily soluble in aqueous solution. As such, its ease of handling is substantially superior to that of the original powder.

A sample of the dust free solid admixture is readily dissolved in an aqueous solution containing 17.5 percent sodium chloride and 2.5 percent propylene glycol. The rennet activity of this final solution is equal to 115 SRA. Potassium sorbate (1 percent) and sodium benzoate (⅛ of 1 percent) are added as preservatives.

A cheddar cheese is made by substituting for the rennet preparation ordinarily used in the setting step, an equivalent amount of the liquid mircobial rennet product prepared above. In this procedure, pasteurized whole milk is adjusted to 86°–88° F and 1 percent by weight of a commercial lactic acid starter solution is added. The microbial rennet is then added to the milk at a rate of 2 to 4 ounces per 1,000 pounds of milk. The mixture is incubated until a curd of satisfactory firmness is obtained. The curd is cut into cubes and then cooked at 100° F for several hours. The curd is separated from the whey and layered into slabs. The milled curd is then salted with 3 percent by weight of cheese salt. The solid curd is transferred to hoops, pressed, and then placed in the curing room. The cheese made from the microbial rennet of this example is sampled periodically after several days of curing and is found to possess excellent quality and to be essentially free from off-flavors.

EXAMPLE 2

Example 1 is repeated except that the strain of Mucor miehei designated NRRL A13,131 is substituted for the strain designated A13,042. Similar good quality stability and handling results as in Example 1 are obtained.

EXAMPLE 3

Examples 1 and 2 are repeated except that polyoxyethylene (20) sorbitan monostearate is substituted for the polyoxyethylene (20) sorbitan monooleate employed in said Examples. Similar good quality stability and handling results as in Examples 1 and 2 are obtained.

Various other examples and modifications and adaptations of the foregoing examples can be devised by the person skilled in the art after reading the foregoing specification and the appended claims. All such further examples, modifications and adaptations as come within the true spirit and scope of the invention are included within said appended claims.

I claim:

1. A stabilized microbial rennet enzyme preparation comprising the solid enzyme product recovered from the fermentation broth of Mucor miehei admixed with from about 2 percent to about 3 percent by weight of fatty acid monoesters of polyoxyethylene sorbitan having from about 12 to about 22 carbon atoms in the fatty acid moiety and an average of about 20 oxyethylene units per molecule.

2. The microbial rennet enzyme preparation of claim 1 in dilute aqueous solution containing additionally about 17.5 percent sodium chloride and about 2.5 percent propylene glycol.

3. The microbial rennet enzyme preparation of claim 1 in which the Mucor miehei is selected from the group consisting of the strains designated NRRL A13,131 and 13,042.

4. The microbial rennet enzyme preparation of claim 2 in which the Mucor miehei is selected from the group consisting of the strains designated NRRL A13,131 and 13,042.

* * * * *